United States Patent [19]

Intermill et al.

[11] Patent Number: 5,631,919
[45] Date of Patent: May 20, 1997

[54] APPARATUS FOR LENGTHWISE GRAPHITIZATION (LWG) OF CARBON ELECTRODE BODIES

[75] Inventors: Allan W. Intermill, Strongsville; Francis E. Wise; David A. Lehr, both of Medina, all of Ohio

[73] Assignee: UCAR Carbon Technology Corporation, Danbury, Conn.

[21] Appl. No.: 561,369

[22] Filed: Nov. 21, 1995

[51] Int. Cl.$^6$ .................................................. H05B 3/00
[52] U.S. Cl. ........................ 373/120; 373/122; 432/126
[58] Field of Search ................................. 373/109, 111, 373/113, 117, 118–120, 57–58, 122; 62/216; 264/451; 428/408; 432/126, 239

[56] References Cited

U.S. PATENT DOCUMENTS

| Re. 27,018 | 1/1971 | Bolkcom et al. ........................ 13/29 |
|---|---|---|
| 800,515 | 9/1905 | Tone . |
| 1,029,121 | 6/1912 | Heroult et al. ........................ 373/114 |
| 1,107,478 | 8/1914 | Bayard . |
| 1,198,616 | 9/1916 | Brown . |
| 1,684,611 | 9/1928 | White . |
| 1,884,600 | 10/1932 | Derby . |
| 1,975,259 | 10/1934 | Derby . |
| 2,621,218 | 12/1952 | Juckniess ........................ 13/7 |
| 3,284,372 | 11/1966 | Bailey ........................ 252/502 |
| 4,015,068 | 3/1977 | Vohler ........................ 13/7 |
| 4,017,673 | 4/1977 | Michels et al. ........................ 373/133 |
| 4,049,900 | 9/1977 | Genevois et al. ........................ 13/7 |
| 4,394,766 | 7/1983 | Karagoz ........................ 373/120 |
| 4,475,207 | 10/1984 | Karagoz ........................ 373/115 |
| 4,639,930 | 1/1987 | Kandzia ........................ 373/120 |
| 4,813,055 | 3/1989 | Heggart et al. ........................ 373/74 |
| 4,916,714 | 4/1990 | Antoni et al. ........................ 373/120 |
| 5,117,439 | 5/1992 | Dagata et al. ........................ 373/88 |
| 5,283,804 | 2/1994 | Holuigue et al. ........................ 373/120 |
| 5,299,225 | 3/1994 | Karagoz ........................ 373/115 |
| 5,330,161 | 7/1994 | Lehr et al. ........................ 266/158 |

FOREIGN PATENT DOCUMENTS

| 172848 | 2/1913 | Canada . |
|---|---|---|
| 332950 | 9/1932 | Canada . |
| 2312749 | 12/1976 | France . |
| 2018764 | 4/1970 | Germany . |
| 2316494 | 10/1974 | Germany . |

OTHER PUBLICATIONS

Public Patent Gazette—Japan Patent Application No.: 1995–18249—Dated: Jun. 27, 1995 (English Translation).
Translation of disclosure of German Patent Application No. 2018764, Graphitizing Furnace, Inventor: Etzel.
Non–Ferrous Metals (Tsvetnye Metally) V.27 No. 4 (1986) Translation of 2316494 (Germany).

*Primary Examiner*—Tu B. Hoang
*Attorney, Agent, or Firm*—Frederick J. McCarthy

[57] ABSTRACT

A furnace apparatus and method for the lengthwise graphitization (LWG) of carbon bodies are provided which utilize U-shaped metal furnace sections mounted on stationary rib supports to contain carbon electrode bodies and surrounding thermally insulating pack material. Vertical flues are provided between parallel rows of U-shaped metal furnace sections to accelerate cooling of graphitized electrode bodies and in a further embodiment water droplets are additionally sprayed on the metal furnace sections.

19 Claims, 15 Drawing Sheets

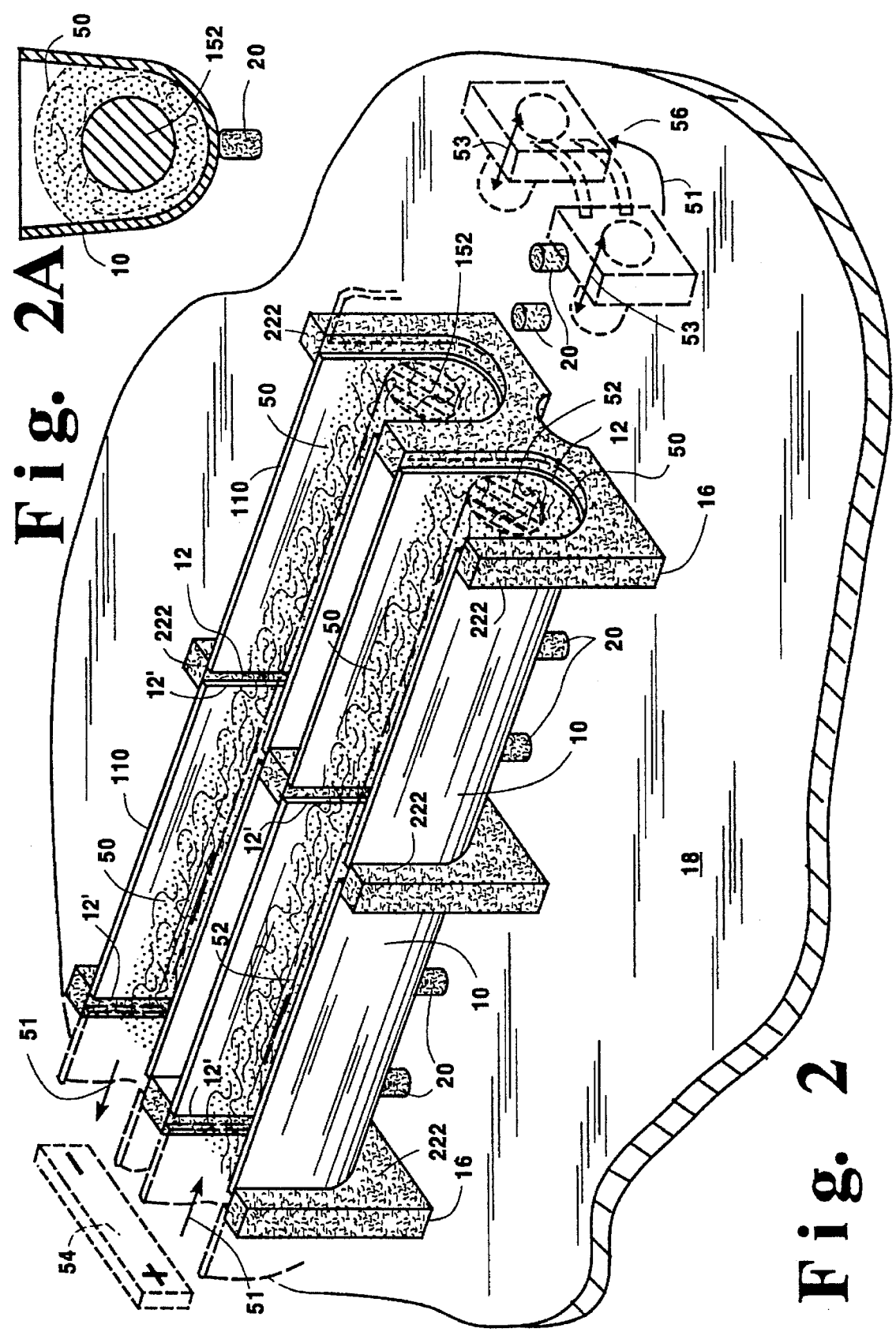

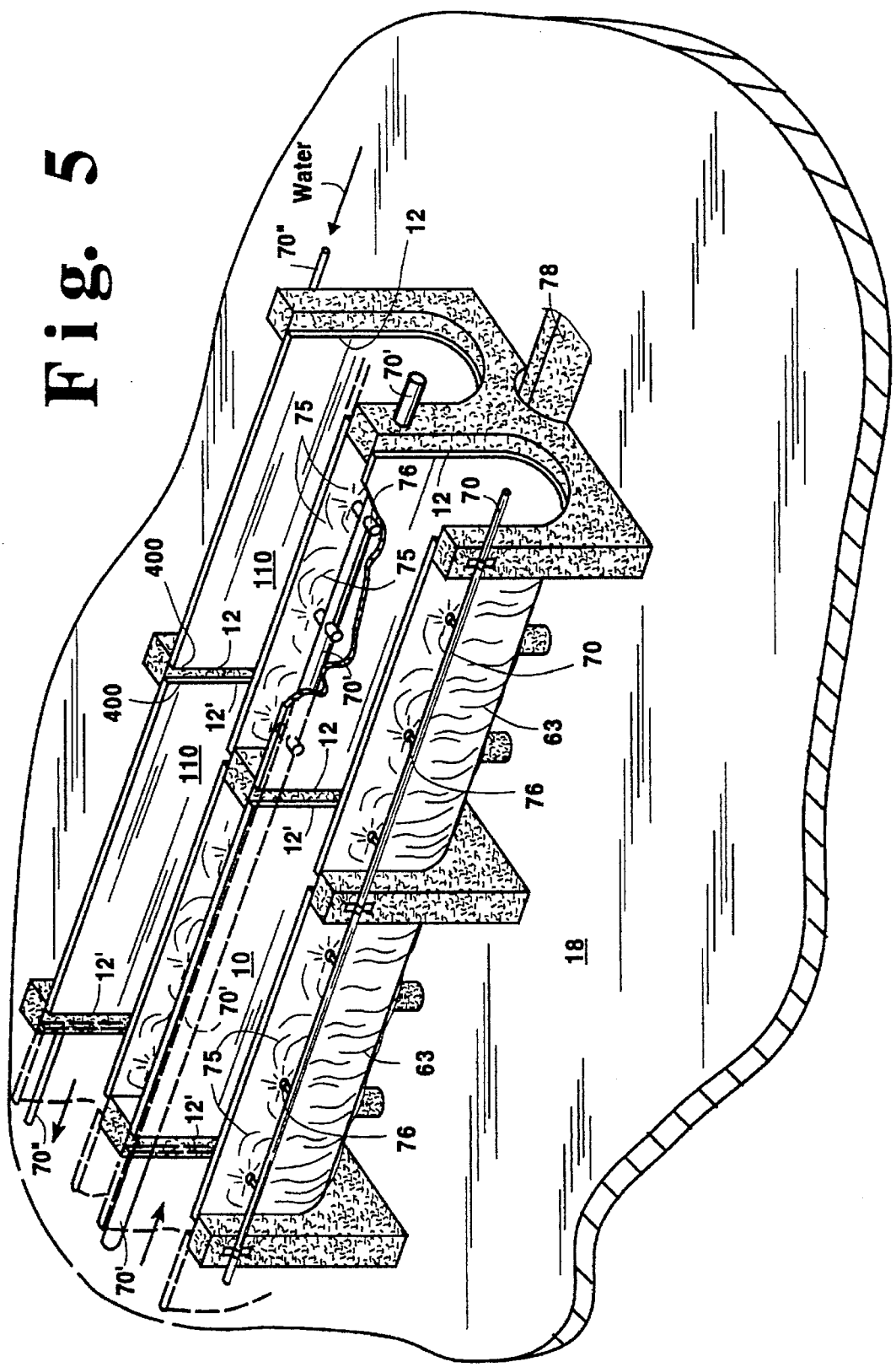

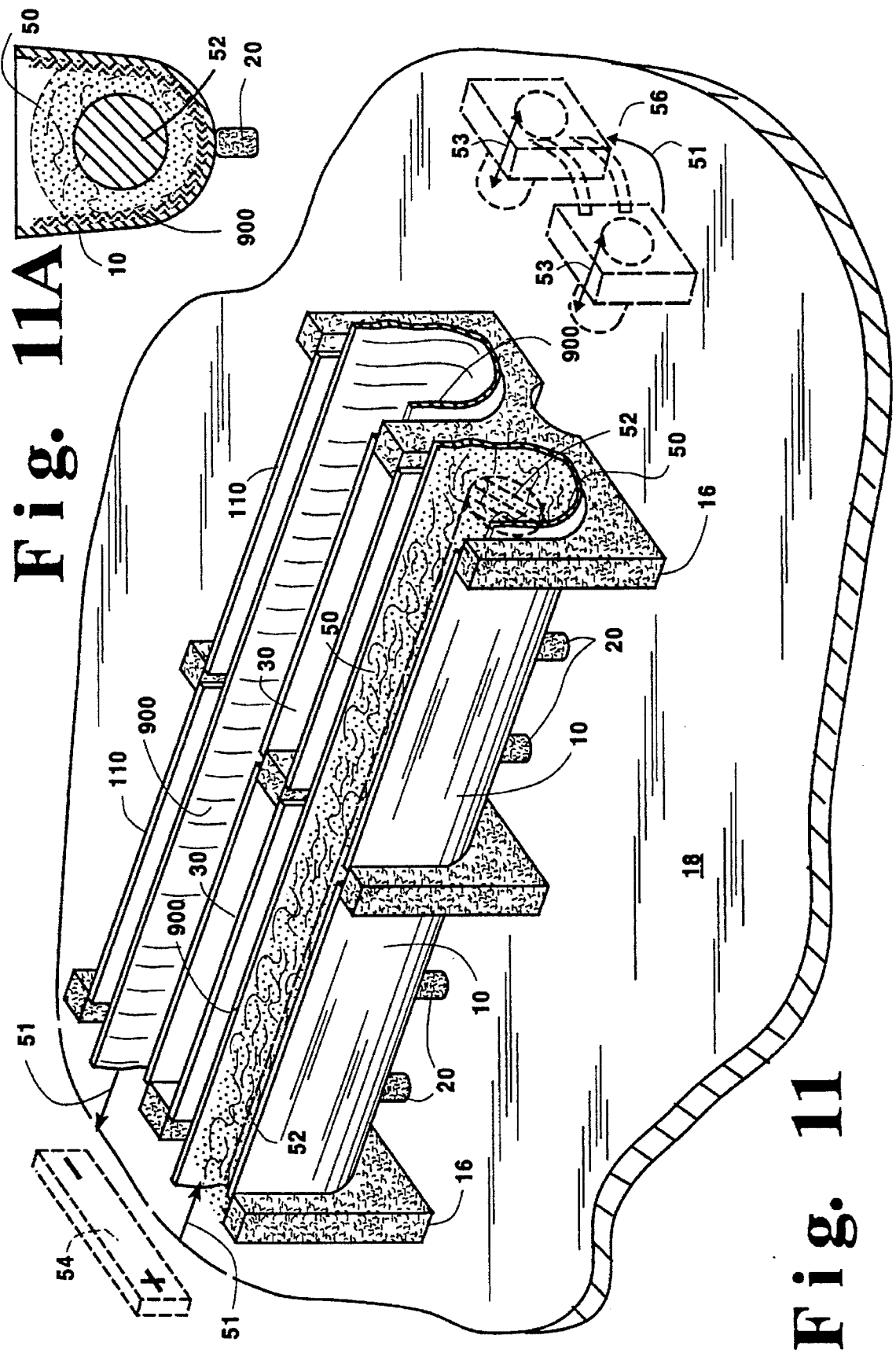

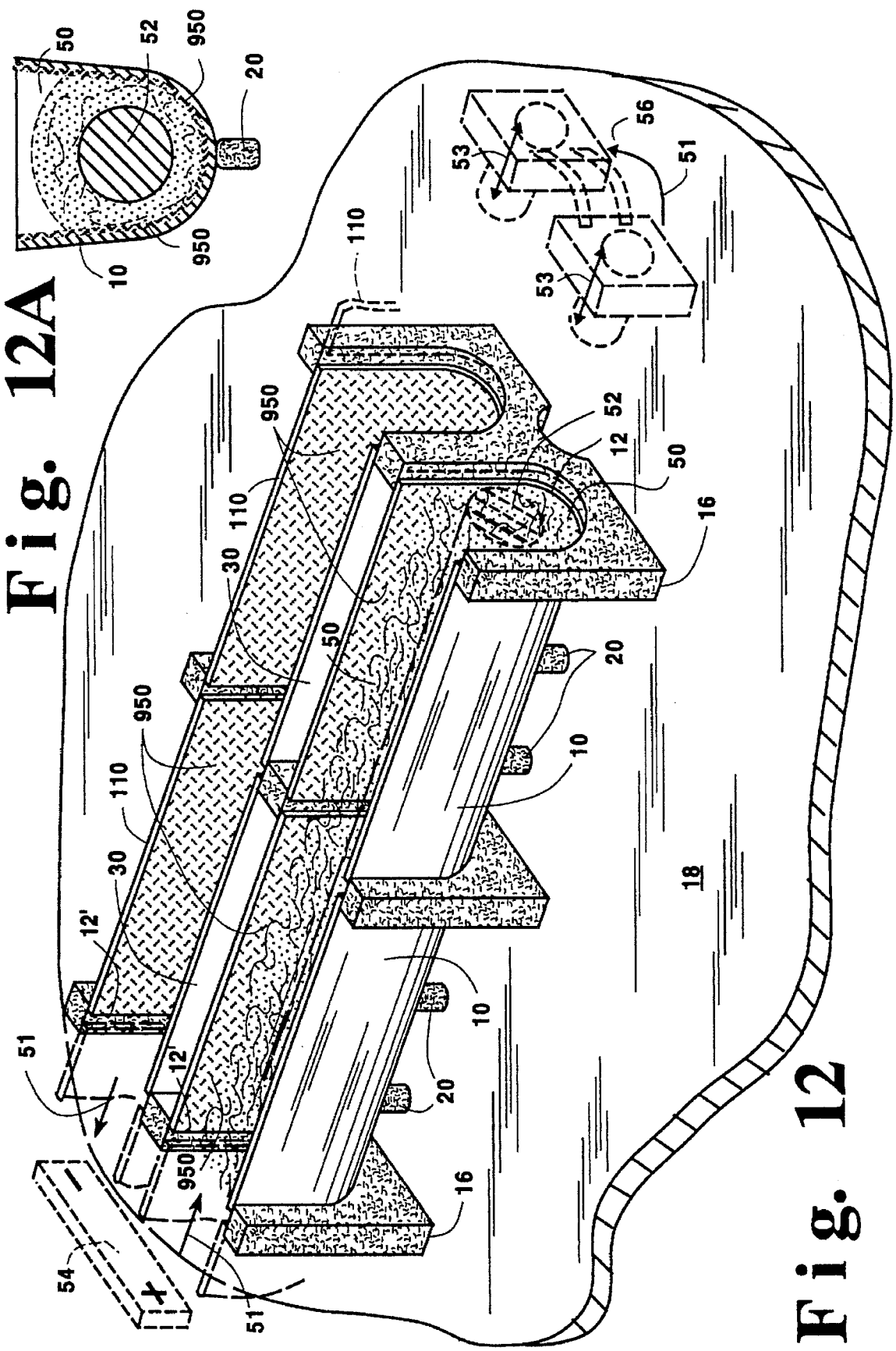

5,631,919

APPARATUS FOR LENGTHWISE GRAPHITIZATION (LWG) OF CARBON ELECTRODE BODIES

BACKGROUND OF THE INVENTION

In the well known LWG process, carbon electrode bodies, typically of cylindrical shape, are placed in end-to-end contact to form an electrically conductive column which is supported on, and also covered by, a heat insulating pack medium, e.g. carbon granules, in a furnace which provides an electrical connection at each end of the column. Electrical current, e.g. from a rectiformer, flows through the column of carbon bodies and heats the carbon bodies to graphitization temperature, e.g. 2500° C.–3500° C. by the Joule effect. The carbon electrode bodies, before graphitization, are formed of amorphous carbon, e.g. coke and binder, and have been previously baked at 700° C. to 1000° C. in accordance with conventional practices. In the course of subsequent graphitization, the amorphous carbon electrode bodies are converted to graphite at high temperatures, up to 3500° C., using very large electrical currents, typically direct current (DC) in the range of 50,000 A to 150,000 A. In the LWG process, two furnaces are sometimes arranged side-by-side with the graphitizing electrical current passing up through the electrode column in one furnace then crossing over and passing back through the column in the other furnace. Apparatus for carrying out the LWG process is the subject of U.S. Pat. No. 1,029,121. Moveable apparatus for carrying out the LWG process is disclosed, for example, in U.S. Pat. Nos. 4,015,068, 4,394,766 and 4,916,714. Similar apparatus for the manufacture of silicon carbide is disclosed in U.S. Reissue Pat. No. 27,018. In a common practice of the LWG process, the time period for heating the carbon electrode to graphitization temperature (2500° C.–3500° C.) is typically 8–18 hours, after which electrical current is discontinued and cooling of the now graphitized electrode, and the pack material, to a safe handling temperature proceeds. The furnace pack material, which acts beneficially as a thermal insulator during the graphitization period, inhibits the rapid cooling of the graphitized electrode bodies down to a temperature at which oxidation of the graphite is substantially avoided, e.g. 900° C.–1100° C., and also retards the heat wave which passes from the graphite electrode through the pack material. Consequently, long cooling periods are required during which the furnace is, in effect, out of operation.

SUMMARY OF THE INVENTION

In order to decrease the time needed for the temperature of the graphitized electrodes to cool from 2500° C.–3500° C. and reach a temperature at which the electrodes can be uncovered and safely removed from the LWG furnace, e.g. 900° C.–1100° C., the present invention comprises a furnace formed of a plurality of electrically isolated U-shaped continuous metal sections arranged in two side-by-side closely adjacent but spaced apart rows which are supported by spaced apart electrically non-conductive ribs which rest on and are affixed to an electrically non-conductive stationary platform, e.g. concrete. The metal sections are suitably steel, e.g. plain carbon steel. High alloy steels, e.g. stainless steels are also suitable. Carbon electrode bodies arranged in a column and surrounded by particulate thermal insulation medium are supported in the metal furnace sections and held in electrical contact with power heads in the conventional manner so that graphitizing electrical current flows through the carbon electrode bodies to heat the carbon bodies by the Joule effect to graphitization temperature. The metal furnace sections are spaced above and away from the stationary base platform to permit air flow under the metal furnace sections. The opposing side surfaces of the metal furnace sections, together with intermediate portions of the rib supports, define a vertical flue between each pair of side-by-side closely adjacent metal furnace sections through which ambient air from below the metal furnace sections passes upwardly at increasing velocity, due to the heating of the air by radiation and from contact with the metal furnace sections, and the venturi shape of the flue. The sides forming the flue and the bottom of the metal furnace sections are cooled by the flow of ambient air which carries away heat from the pack material in the furnace and the heat front passing from the graphitized electrode bodies through the thermally insulating pack material to the metal furnace sections. The provision of a plurality of separate vertical flues results in uniform cooling along the length of the furnace since cross-flows of the cooling air are minimized and the cooling air rises uniformly in each of the flues. The result is that the graphitized electrode bodies more rapidly reach a safe temperature (e.g. 900° C.–1100° C.) at which they can be removed from the pack and furnace.

Additional heat removal and a more rapid approach to a safe electrode removal temperature is achieved by nozzle spraying the outer surface of the sides of the metal furnace sections opposite the pack material contacting the inner surface of the metal furnace sections with water droplets in an amount to form a covering layer of water on the sprayed sides and also on the adjacent bottom portions of the metal furnace sections. The water spraying also additionally and importantly minimizes thermal expansion of the metal furnace sections which slidably rest on the rib supports when the temperature of the metal furnace sections is held to less than 100° C., e.g. 40°–50° C. due to the maintenance of a layer of water on the metal furnace sections after graphitization of the electrodes has been accomplished.

BRIEF DESCRIPTION OF THE DRAWINGS

FIG. 2, FIG. 2A show the furnace portion of FIG. 1 with carbon electrode bodies supported on and covered by thermally insulating pack material;

FIG. 5, FIG. 5A show the furnace of FIG. 1 with means for water spray cooling the furnace of the present invention;

FIG. 11, FIG. 11A, FIG. 12, and FIG. 12A show arrangements for electrically insulating carbon electrode bodies from metal furnace sections.

DESCRIPTION OF PREFERRED EMBODIMENT

Figure 1:
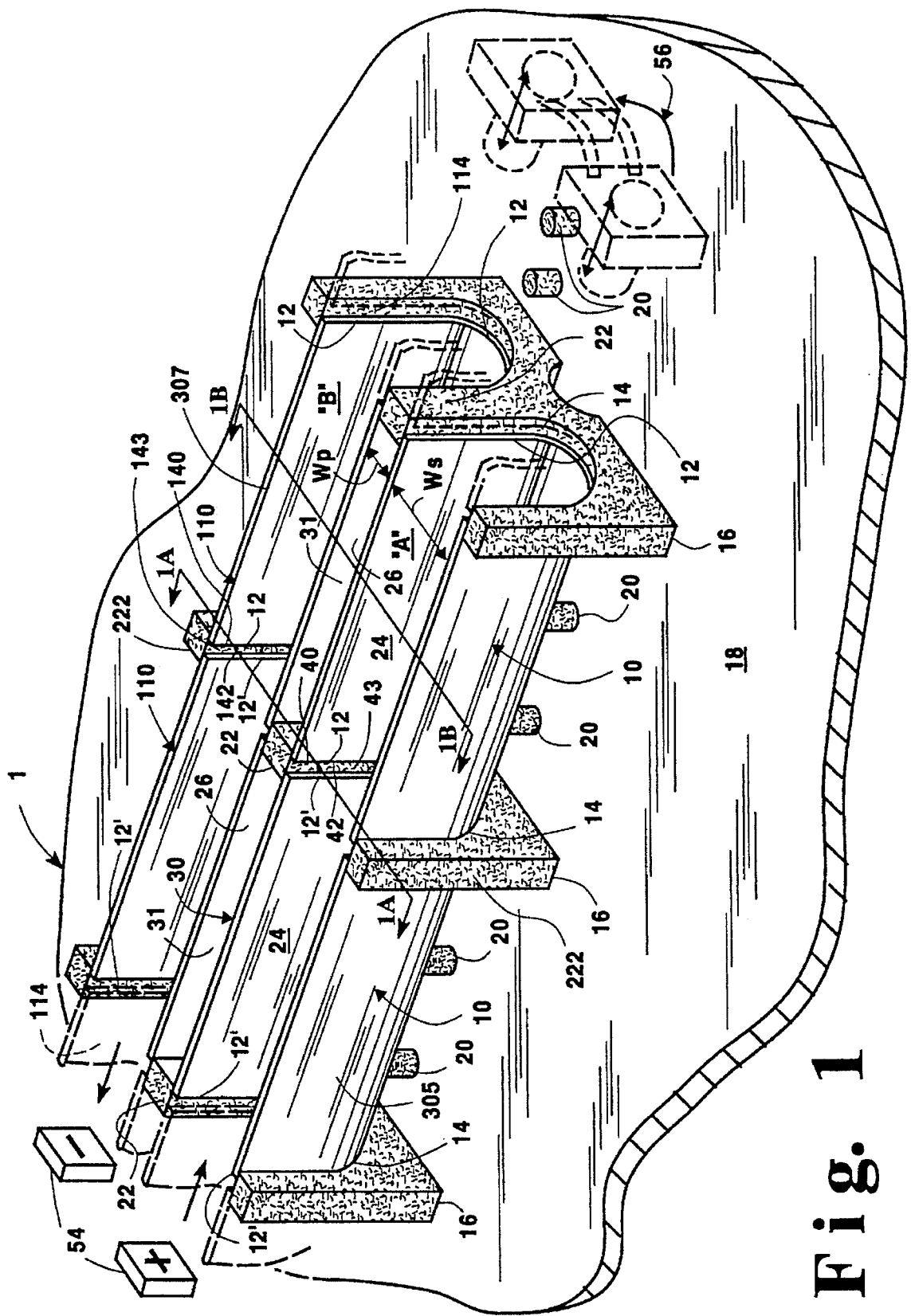
FIG. 1, shows a portion of lengthwise graphitization (LWG) furnace in accordance with the present invention prior to the loading of the furnace with thermally insulating pack material and carbon electrode bodies.
Figure 1A:
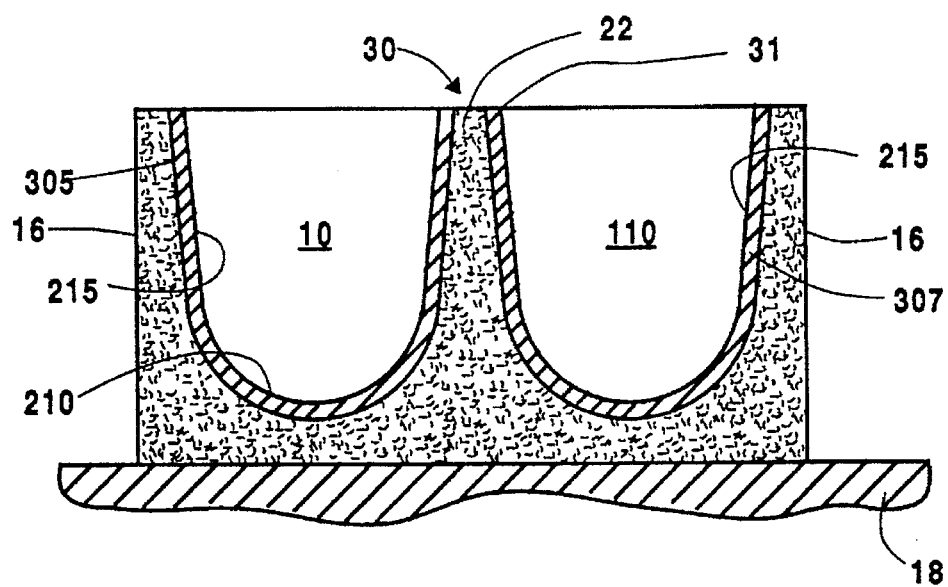
FIG. 1A shows a cross section through "22" of FIG. 1

A furnace apparatus of the invention for graphitization of carbon bodies is shown at 1 in FIG. 1 comprising two of a plurality, which can be 12 or more; of open top U-shaped metal furnace sections 10 arranged in-line in a first row "A". The longitudinally opposed U-shaped peripheral end portions 12, 12' of each metal furnace section 10 slidably nest in correspondingly U-shaped apertures 14 of respective vertically oriented rib supports 16 which are made of electrically non-conductive refractory material, e.g. concrete. As shown in FIG. 1A, the metal furnace sections 10 preferably have substantially spherically shaped, rounded bottom portions 210 and substantially straight and slightly outwardly tapered side portions 215. The metal furnace sections 10 are not affixed to rib supports 16 and are readily insertable and are readily removeable for repair and replacement of the furnace sections 10. The vertical, longitudinally spaced apart rib supports 16 are fixedly supported on furnace room floor 18, typically an electrically nonconductive stationary concrete platform, and rib supports 16 maintain the bottoms of metal furnace sections 10 spaced above the furnace floor, e.g. ½ to 2 feet to permit the free flow of ambient air. Electrically non-conductive dowels 20, suitably cast in-place concrete, can be spaced at intervals directly beneath and along the bottom of metal furnace sections 10 to provide additional support while maintaining the space below the metal furnace sections substantially open to permit free air flow. Metal furnace sections 10 are not affixed to dowels 20. The dowels 20 are suitably about 6 inches in diameter and spaced 3–4 feet apart so that substantially all of the bottom of metal furnace sections 10 is exposed to ambient air. A second row "B" of metal furnace sections 110 is provided parallel, and laterally adjacent, to the first row "A" comprising metal furnace sections 10. The metal furnace sections 110 of row "B" are laterally in register with metal furnace sections 10 of the first row "A" and nest in U-shaped apertures 114 of rib supports 16 which are closely laterally adjacent and spaced from U-shaped apertures 14. Apertures 14 and 114 are spaced apart by posts 22 which are integral central portions of rib supports 16. Posts 22, with adjacent sides 24, 26 of metal furnace sections 10, 110, define individual vertical flues 30 having a flaring, venturi-shaped bottom opening 32, shown in FIG. 1A, through which ambient air is drawn upward at increased velocity to provide cooling of the opposed sides and adjacent bottom portions of metal furnace sections 10, 110. The stationary metal furnace sections 10, 110 are relatively close together with the separating posts 22 (and also end posts 222) having a width Wp which is about 10% to 20% of the metal furnace section width, Ws. The upper opening 31 of flue 30 is substantially less in width than bottom opening 32 to enhance the venturi effect in flue 30.

The adjacent opposed ends 40, 42 and 140, 142 of metal furnace sections 10 and 110, resting on rib supports 16, are spaced apart, as indicated at 43 and 143, to establish electrical isolation between the respective longitudinally in-line metal furnace sections 10, of row "A", and the respective longitudinally in-line metal furnace sections 110 of row "B".

With reference to FIG. 2, in operation, metal furnace sections 10, 110 contain pack material 50, e.g. carbon granules introduced from an overhead crane, which supports and covers carbon bodies 52, 152, which are arranged in contact in a column in metal furnace sections 10 and 110.

Electrical current is conventionally provided from a rectiformer, shown schematically at 54, which passes at 51 through carbon bodies 52 (arranged in metal furnace sections 10), a conventional cross-over mechanism shown schematically at 56, carbon bodies 152 arranged in metal furnace sections 110, and returns to rectiformer 54. Cross-over mechanism 56, in addition to conducting current from bodies 52 to bodies 152, can adjustably maintain pressure on the columns (52, 152) as indicated schematically at 53. A conventional head electrode (not shown) is positioned between each column and the rectiformer 54.

The electrical current is typically applied at a level of about 50,000 A to 150,000 A for a time of about 8 to 18 hours to graphitize the carbon bodies 52, 152, at which time the electrical current is turned off. The graphitized carbon electrode bodies 52 are at a temperature of 2500° C. to 3500° C. when the electrical current is turned off and the graphite electrodes must cool to about 900° C.–1100° C. before the covering pack material can be safely removed, e.g. by suction from an overhead crane, and the graphitized carbon bodies removed from the furnace without danger of significant oxidation. Furnace operation is re-commenced after removal of pack material, e.g. by suction.

Figure 3:
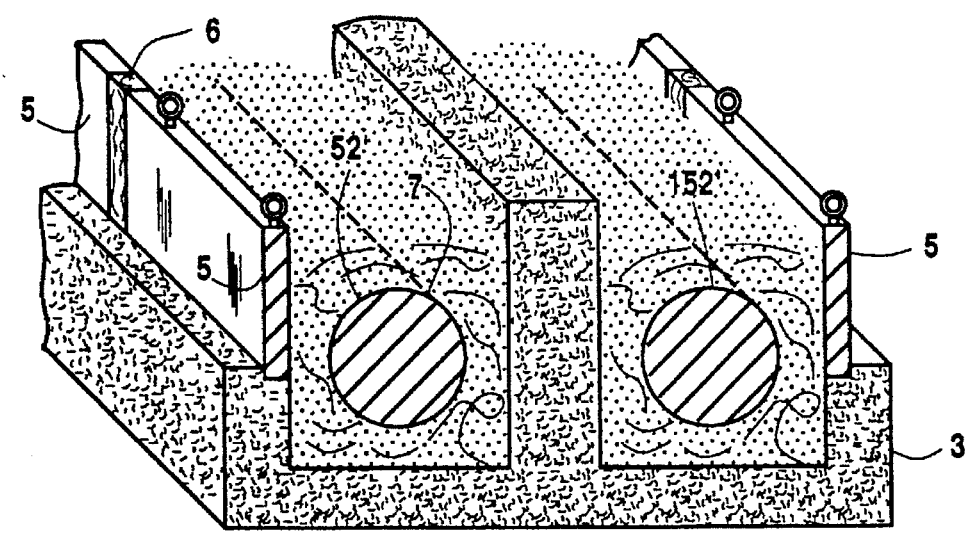
FIG. 3 shows the general arrangement of a prior art LWG furnace.
Figure 1B:
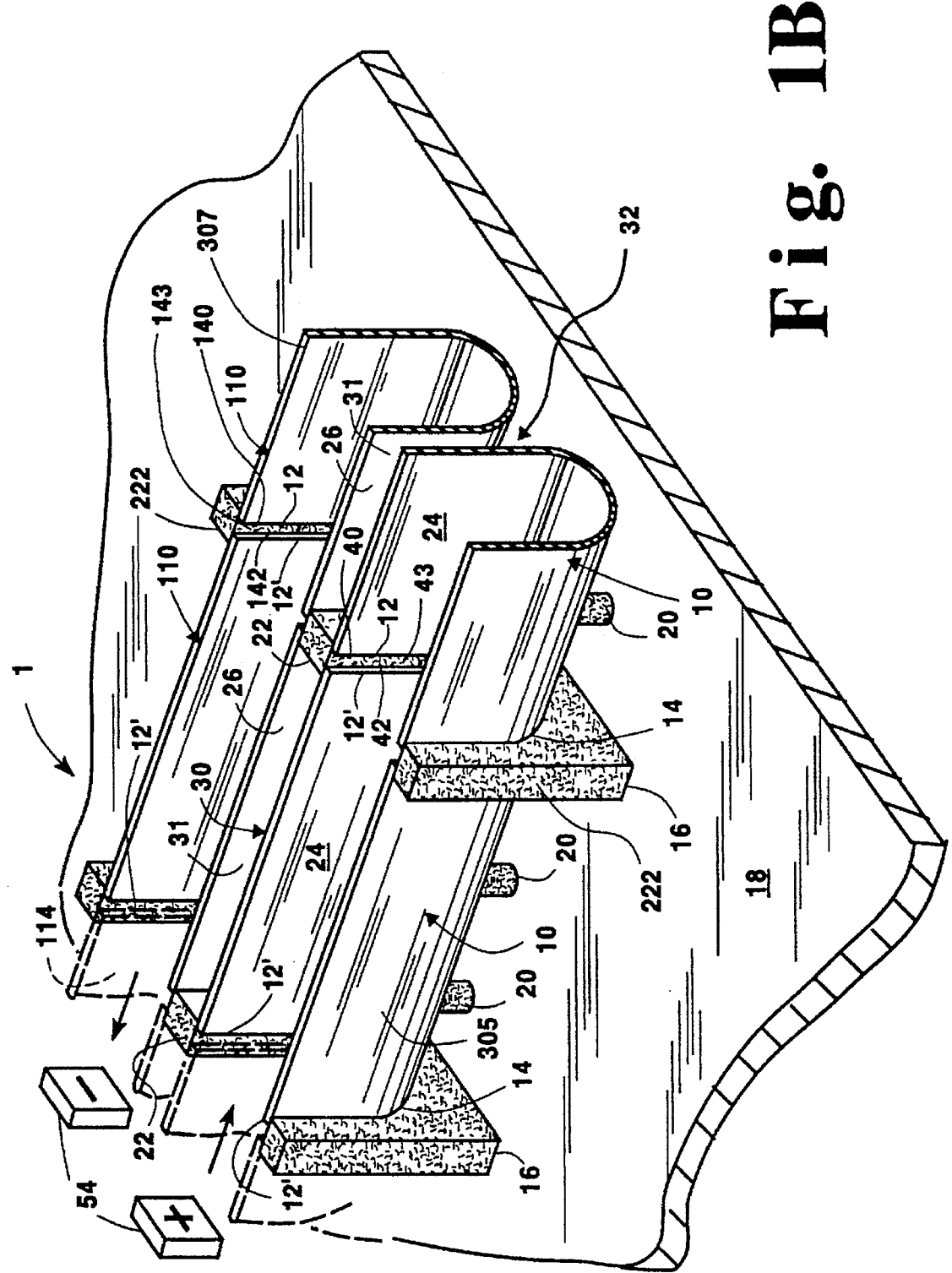
FIG. 1B shows a cross-section through "10" and "110" of FIG. 1.

The length, i.e. duration, of the graphite electrode cooling period to 900° C.–1100° C. is an important commercial consideration since the furnace is out of operation until it can be emptied of the graphitized carbon bodies. The cooling period for a long-standing state-of-the-art LWG furnace shown in FIG. 3 for 22 inch diameter carbon bodies in columns 70 feet long is about 85 hours to reach 900° C. (See curve "A" of FIG. 4). The prior art furnace of FIG. 3 comprises a concrete furnace shell 3 with removable metal sidewalls 5 separated by electrically insulating material 6, e.g. Kaowool, enclosing pack material 7 and carbon electrode bodies 52', 152'. The furnace apparatus of FIGS. 1 and 2 in accordance with the present invention with a plurality of central flues 30 and venturi inlets 32 resulted in a substantially decreased cooling period of 55 hours as illustrated by curve "B" of FIG. 4.

Figure 4:
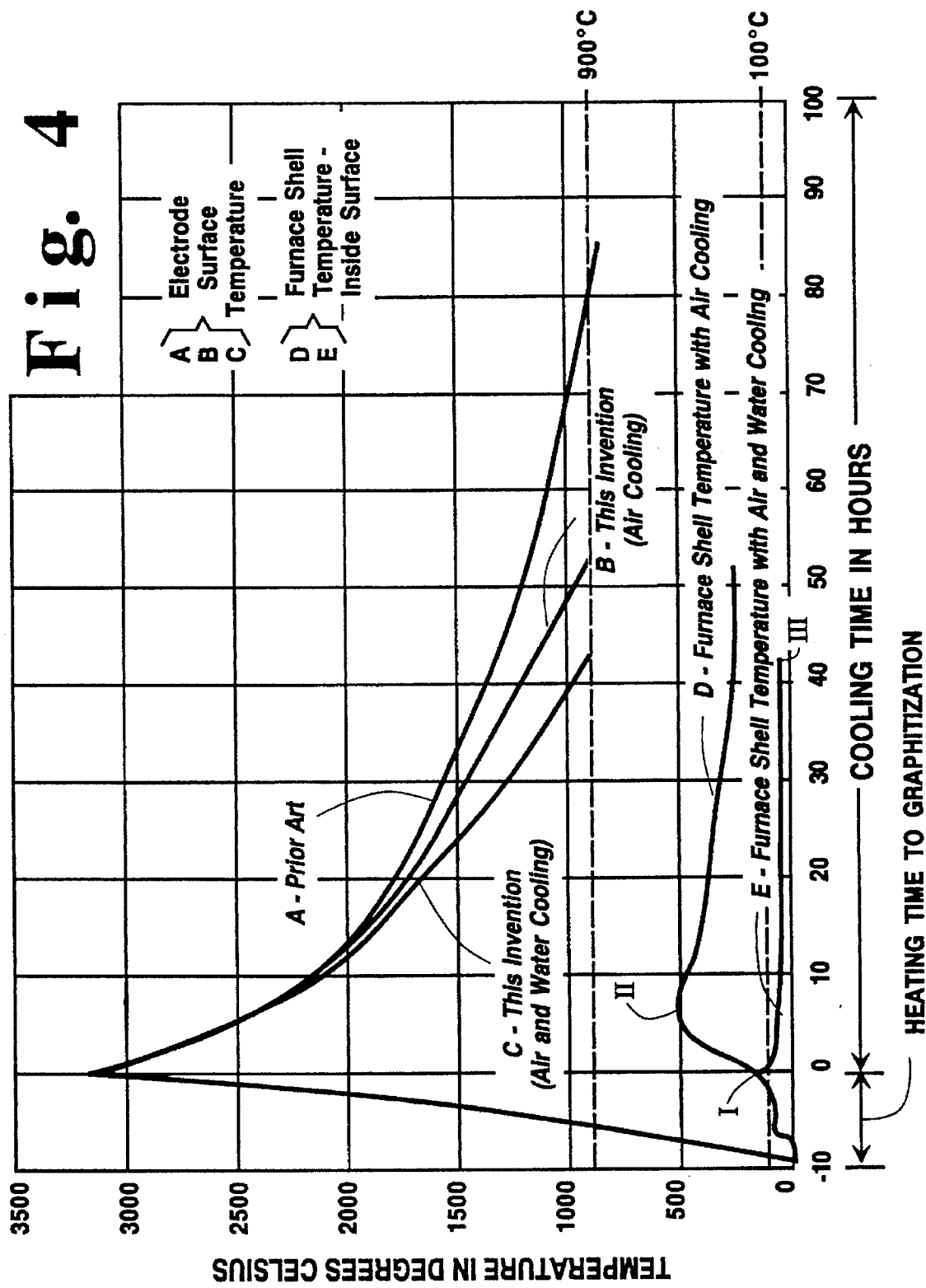
FIG. 4 shows graphs based on data obtained from the operation of a prior art LWG furnace and in the practice of the present invention.
Figure 5A:
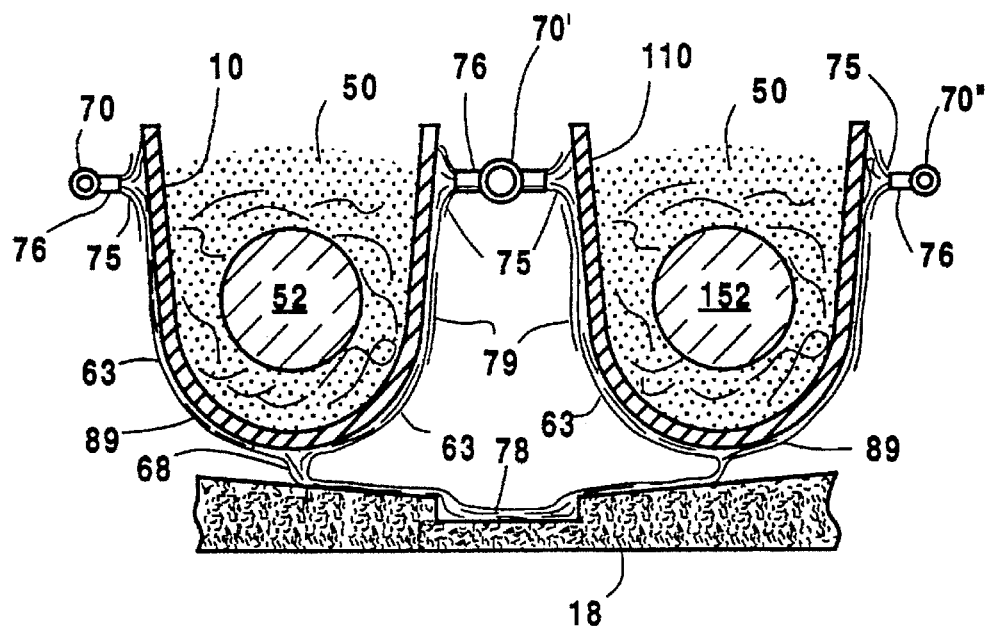

In the apparatus of FIG. 5, the sides of metal furnace sections 10, 110 are cooled by the continuous spraying of liquid water droplets 75 from spray nozzles 76 on to the sides of the metal furnace sections 10, 110 in an amount and at a rate so that the water droplets provide a turbulent covering layer of liquid water on the sides and bottom portions of the metal furnace sections 10, 110 opposite pack material 50 as shown in FIG. 5A. The spray cooling is provided by water from feed conduits 70, 70', 70" which extend adjacently parallel to the outer side walls of the metal furnace sections 10, 110. Nozzles 76 on the water feed conduits direct liquid water droplets 75 to the outer side surfaces 79 of metal furnace sections 10, 110 at a location opposite pack material 50 to provide a covering layer of turbulent water flow shown at 63 in FIG. 5A on the side surfaces 79 and bottom surfaces 89 of metal furnace sections 10, 110 to cool the metal furnace sections 10, 110 and the pack material 50 in contact therewith to thereby increase the temperature gradient between the graphitized electrodes 52, 152 and the metal furnace sections 10, 110. This increases the rate of cooling of the electrodes 52, 152. Water passes by gravity to furnace room floor platform 18 and is removed for re-cycling via floor drain 78 as shown in FIG. 5A. The apparatus of FIG. 5 provides a significant lessening of the graphite electrode cooling period as shown at curve "C" in FIG. 4. The metal furnace section (10, 110) temperatures which are lowered by air cooling down to 500° C. and lower as shown at "D" in FIG. 4 are greatly reduced and minimized to less than 40°–50° C., as shown at "E" in FIG. 4, which essentially eliminates any adverse effect of thermal expansion of the metal furnace sections 10, 110. Water can be sprayed on the metal furnace sections during the graphitization period (−10 to 0 hours) while electric current is passing through the electrodes, but as a practical matter can be delayed until graphitization is complete (see "I" in FIG. 4) since the heat wave from the graphitized electrodes would not reach the metal furnace sections for several hours (see "II" in FIG. 4). The water spray can be discontinued when the electrode temperature reaches 900° C. (see "III" in FIG. 4). In FIG. 4, the temperatures for curves A, B, C were measured at the surface of electrodes; for curves D and E the temperatures were measured at the inside surface of the metal furnace sections.

In the practice of the present invention, the water spray is adjusted to provide discrete droplets 75 which impact the metal furnace section outer surface and coalesce to provide a sheet or layer 63 of water flow on the surface of the sides and bottoms of the metal furnace section sections which wets and clings to the surface of the sides and bottoms of the metal furnace sections until draining off by gravity as shown at 68 in FIG. 5A. Water as thus applied can reduce the temperature of the metal furnace sections to about 40°–50° C., as shown in FIG. 4, and the air below the metal furnace sections is still sufficiently heated to cause the air to rise through the vertical flues 30 and contribute to the cooling of the metal furnace sections and maintain uniformity of cooling.

During operation of a LWG furnace using metal furnace sections such as shown at 10, 110 in FIG. 1, very high temperatures may occur at terminal portions 12, 12' which rest in the U-shaped apertures 14, 114 of rib supports 16. Since, in the embodiment shown in FIG. 1, the terminal portions 12, 12' abut the rib supports 16, the liquid water spray from nozzles 76 as applied in FIG. 5 cannot completely contact the terminal end portions 12, 12'. In order to achieve full cooling at the terminal portions 12, 12' of the metal furnace sections 10, 110, the metal furnace sections have been provided with specially configured terminal support elements.

Figure 6:
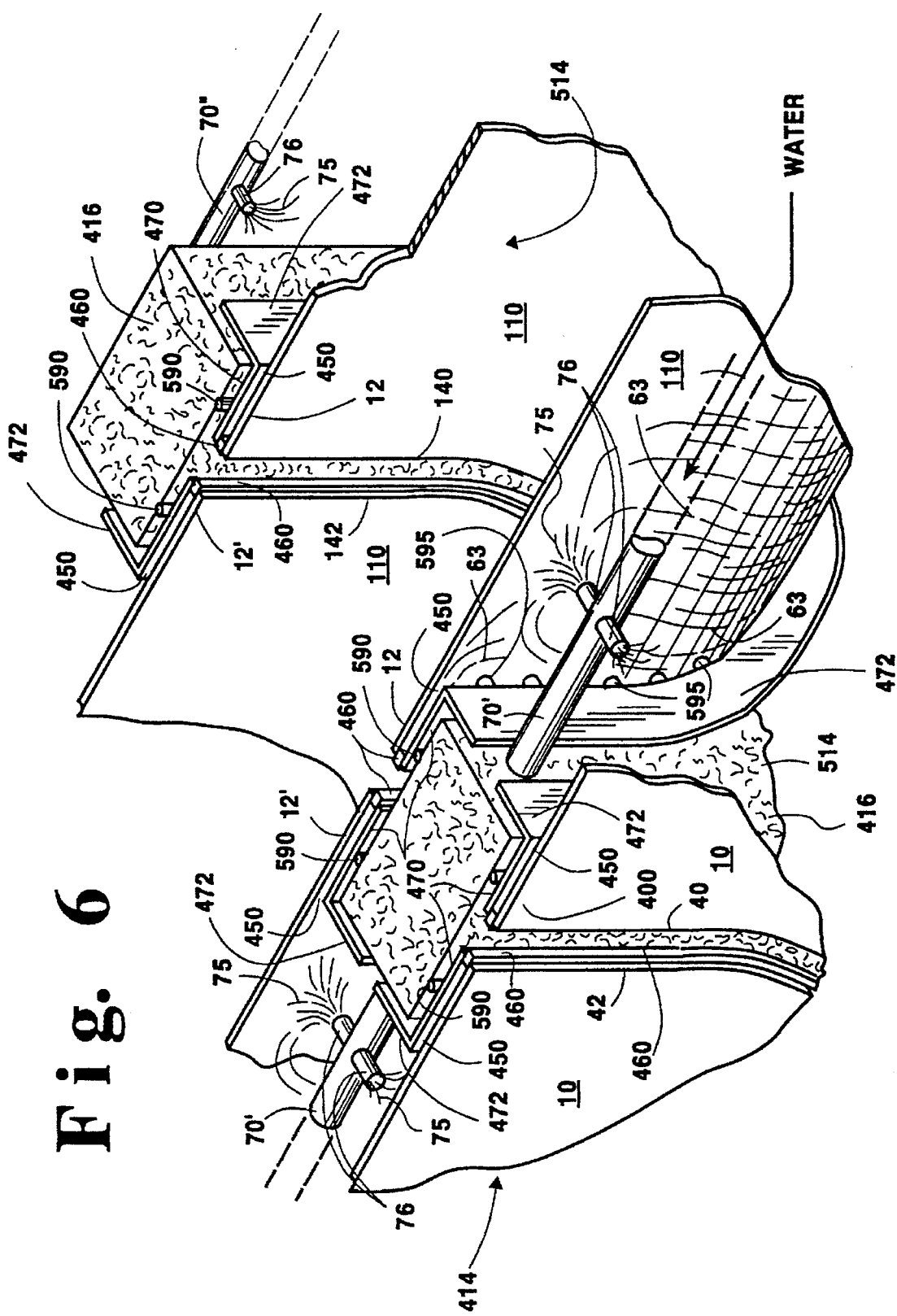
FIG. 6, 6A show an embodiment of the present invention in which a metal furnace section of the furnace of FIG. 5 is configured to receive water cooling at a particularly critical location.
Figure 6A:
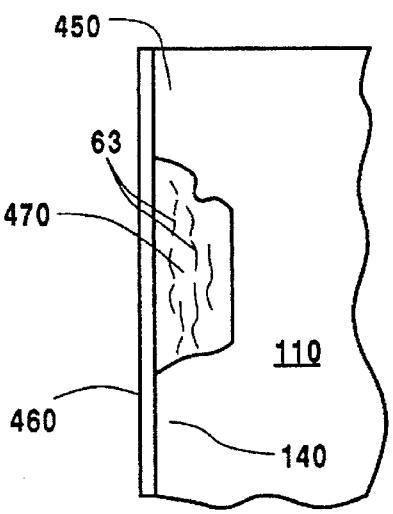
Figure 7:
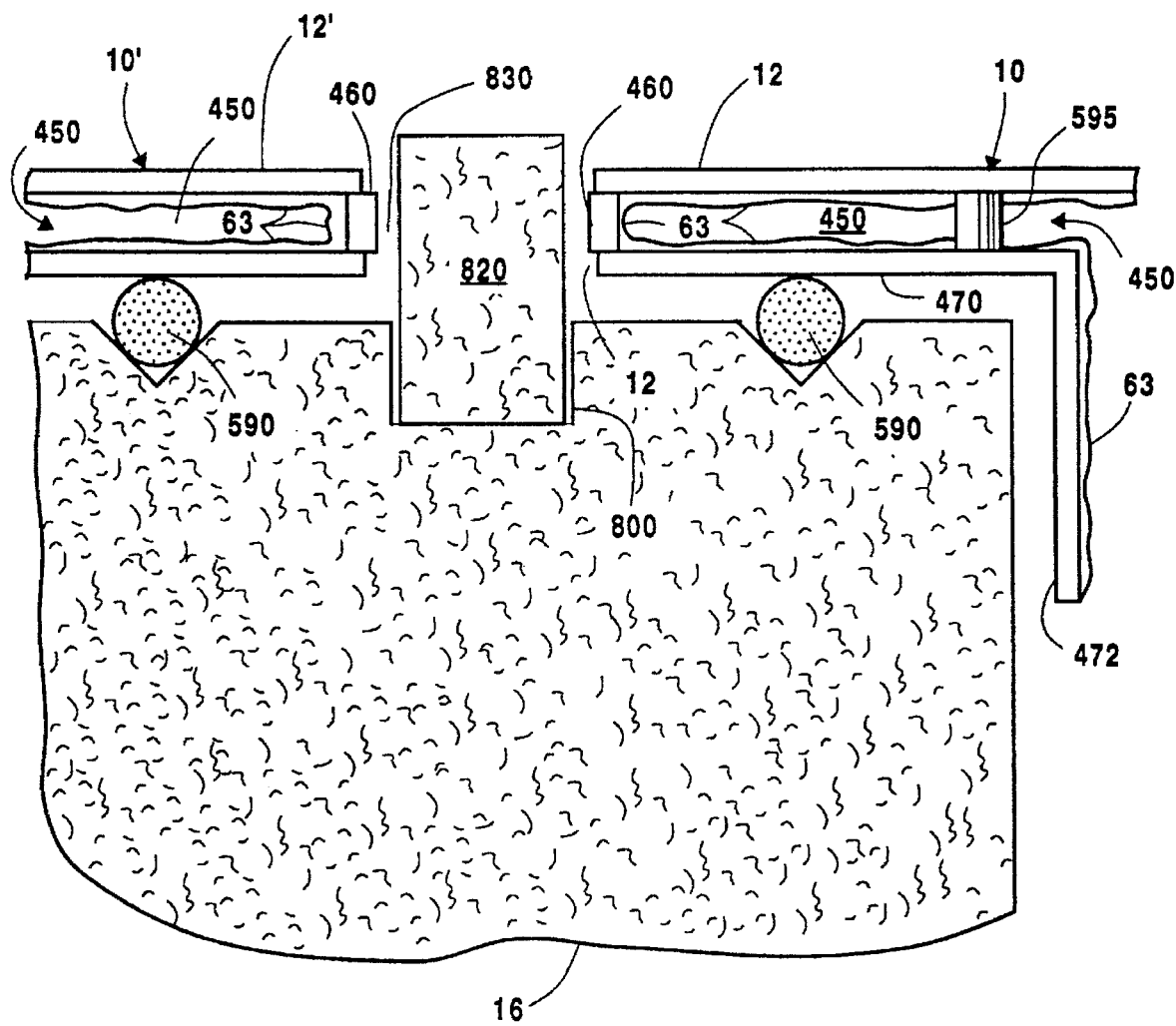
FIG. 7, 8, 9, 10 and 10A show arrangement for enhancing the electrical isolation between in-line metal furnace sections of an LWG furnace.

With reference to FIGS. 6, 6A and 7, U-shaped open top metal furnace sections 10, 110 are nested in rib supports 416 with respective adjacent terminal portions 12, 12' for engaging U-shaped apertures 414, 514 of vertical refractory rib supports 416. A peripheral exterior open channel 450 is provided at the terminal portions 12, 12' of each of the U-shaped metal furnace sections 10, 110 between the terminal portions 12, 12' and rib support 416. Each channel 450 of a metal furnace section 10, 110 has a peripheral U-shaped channel metal closure member 460 extending transversely to the metal furnace section. A peripheral metal channel side wall or sleeve 470 is provided integral with and transverse to each channel closure member 460 extending adjacently parallel to and spaced from the terminal portion 12, 12' of metal furnace sections (10, 110) to define the open peripheral channel 450 surrounding the terminal portions 12, 12' of the metal furnace sections (10, 110) which is exposed to and receives water sprayed from nozzles 76 and receives coolant water in liquid form as is also shown schematically at 63 in FIG. 6A. The coolant water spray droplets 75 coalesce form a layer 63 of turbulently flowing liquid on the outer surface of the terminal portions 12, 12' and also channel side walls 470 and closure member 460 to maintain the temperature of terminal portions 12, 12', channel closure elements 460 and channel side walls 470 below 100° C. A peripheral flange element 472 is provided integral with the channel side wall 470 to securely engage the rib support 16. Peripheral seals can be provided, as shown at 590, to provide firm seating of metal furnace sections (10, 110) in rib support 16. Spacing pins 595, suitably made of steel and welded to metal furnace sections (10, 110) and channel side walls 470 can be employed to ensure that channel 450 remains open even if subjected to accidental mechanical shock.

Figure 8:
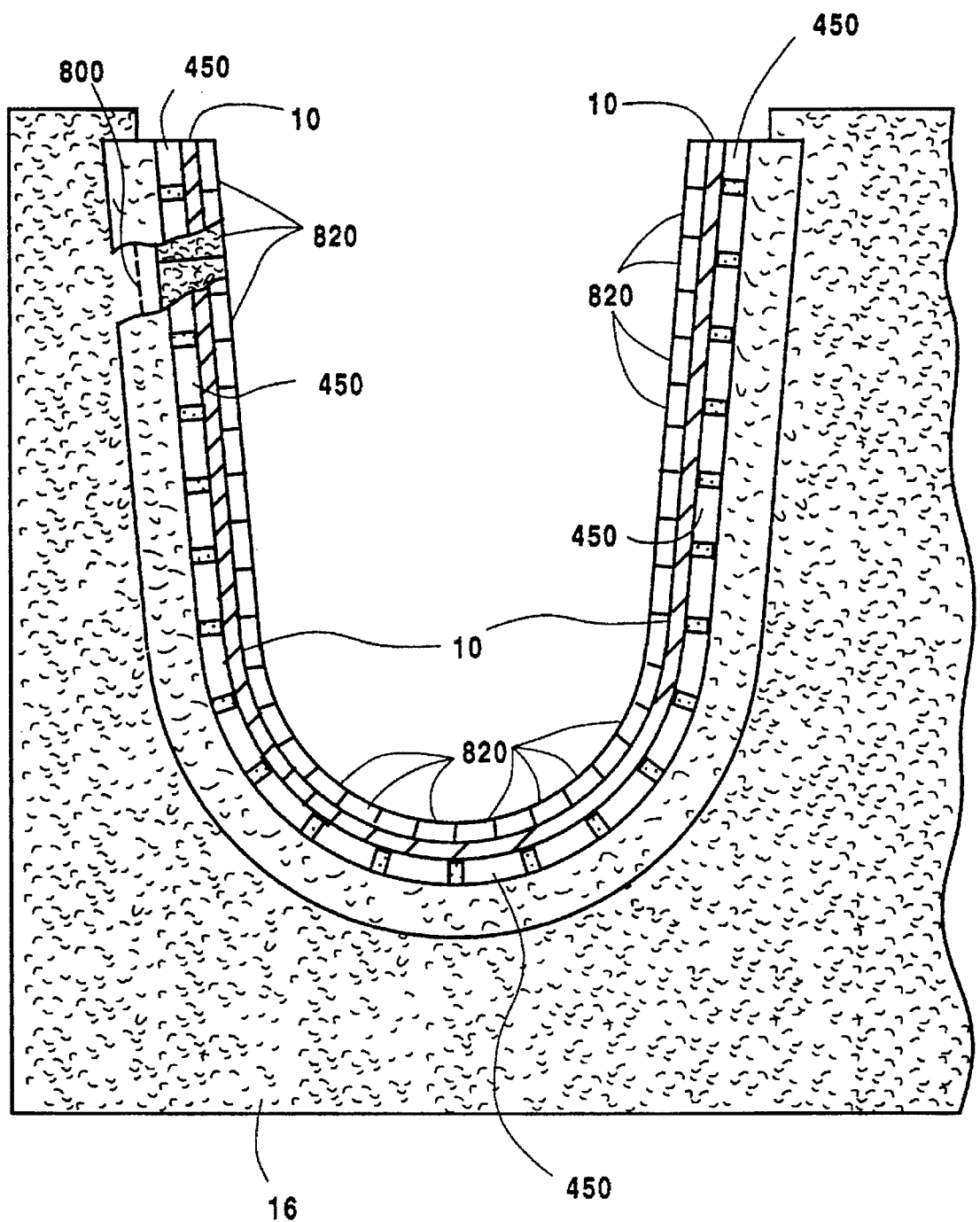
Figure 9:
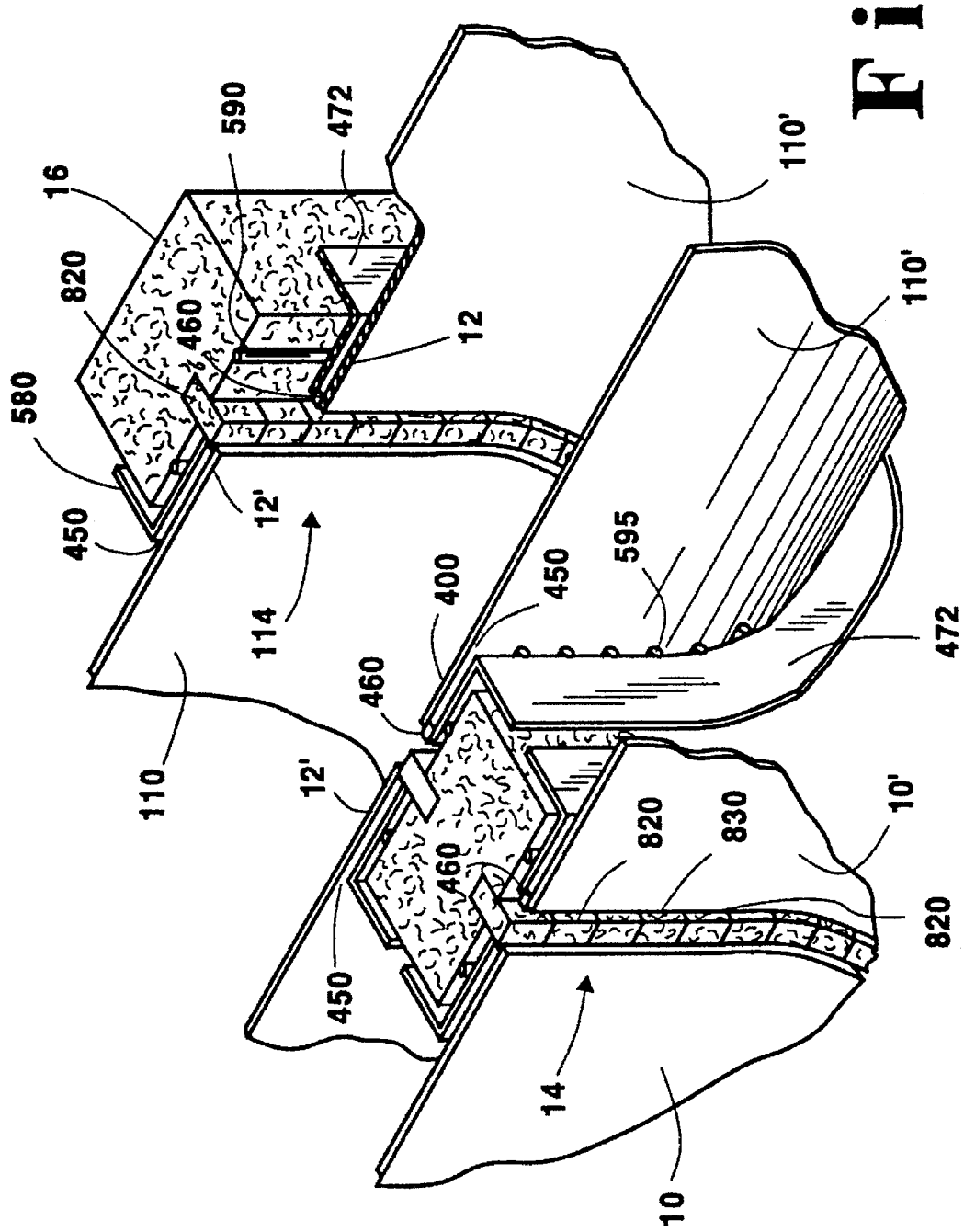

It is important to provide electrical isolation between the opposing edges 12, 12' of longitudinally adjacent metal furnace sections 10, 10' indicated in FIG. 7 (and also in FIGS. 1 and 2). An embodiment of the invention to achieve this result, with reference to FIGS. 7, 8, 9, includes a U-shaped recessed groove 800 provided in the U-shaped aperture 14, 114 of each rib support 16 which is co-extensive with the U-shaped aperture (16, 116). Pre-formed refractory ceramic bricks 820, e.g. made of alumina, are set in the recessed groove 800 and extend from the groove 800, as indicated at 830, outwardly beyond the metal furnace sections 10, 10' (and 110, 110') to provide insulation to prevent electric current flow between metal furnace sections 10, 10' (and 110, 110 ').

Figure 10:
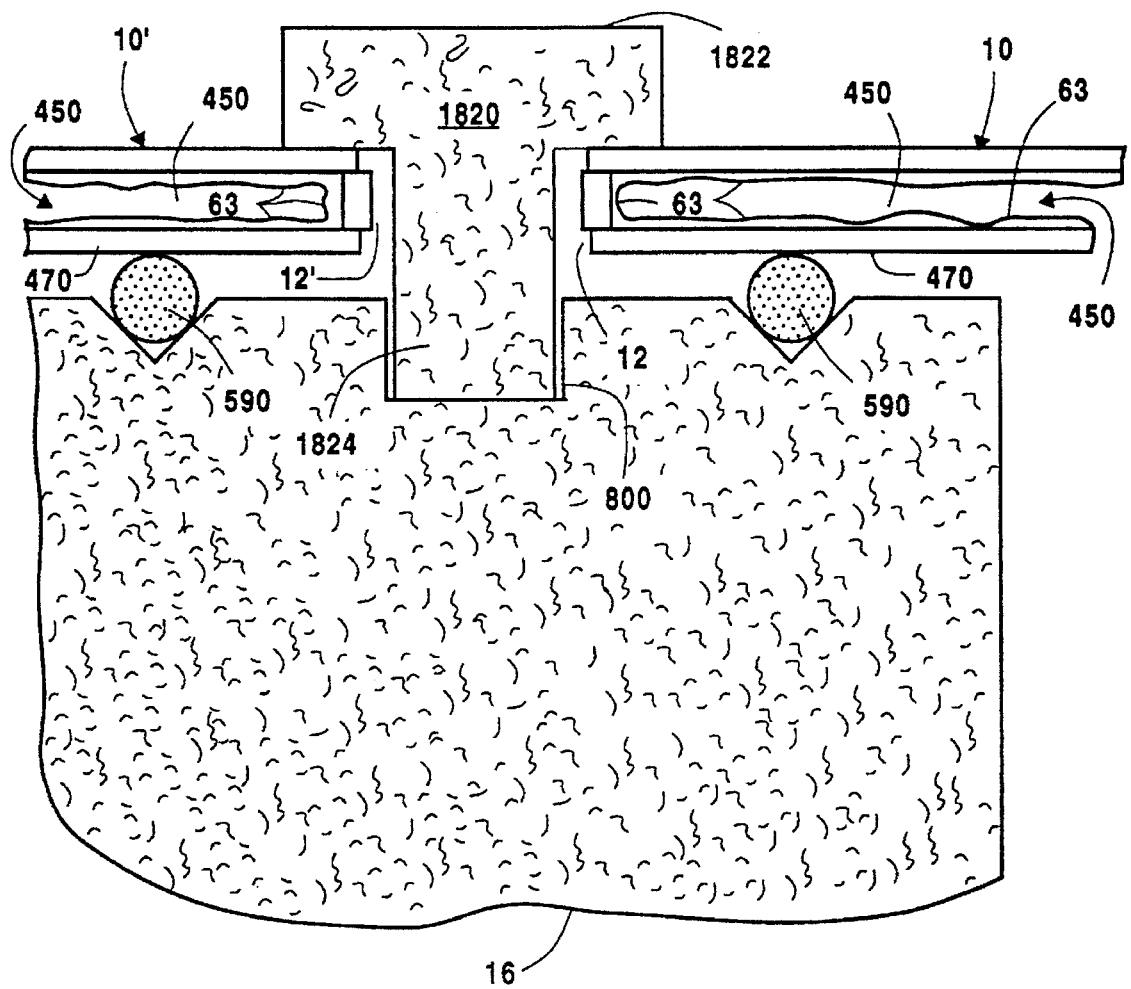
Figure 10A:
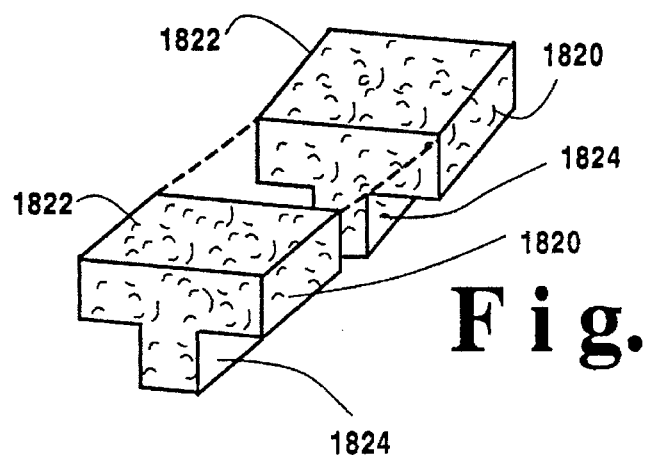

In a preferred embodiment of the present invention, the pre-formed refractory brick is generally T-shaped as shown in FIGS. 10, 10A at 1820 and have top cross portions 1822 which rest on the outer surface of metal furnace sections 10, 10' (110, 110') and base portions 1824 perpendicular to the cross portions 1822 which extend into and are fitted into the groove 800. As shown in FIG. 10A, the pre-formed bricks 1820 (820) are shaped to conform to the shape of the U-shaped aperture.

During the graphitization of carbon electrode bodies, very high currents, typically 50,000 A to 150,000 A, are passed through the carbon bodies at relatively applied low voltages, e.g. about 100 volts D.C. With reference to FIG. 11, a voltage of about 100 volts is applied from rectiformer 54 to carbon electrode bodies 52 arranged in metal furnace sections 10, 110 (electrode bodies are not shown in sections 110). It is important that metal furnace sections 10, 110 be electrically isolated from carbon electrode bodies 52 during graphitization when the carbon electrode bodies 52 have a voltage applied thereto from rectiformer 54, i.e. when there is a potential difference between the electrode bodies and the metal furnace sections. To achieve the desired electrical isolation, a corrugated cardboard liner 900, similar to the material cardboard cartons, is placed in metal furnace sections 10, 110, contiguous thereto, and carbon granule pack material 50 is confined within the cardboard liner 900, and carbon electrode bodies 52 are covered by the carbon pack material 50. Since the voltage, i.e. electric potential, applied to the carbon electrode bodies 52 during graphitization is relatively low, e.g. 100 volts D.C., the cardboard provides adequate and essentially complete electrical isolation between the carbon electrode bodies 52 and metal furnace sections 10, 110 and the cardboard maintains its physical integrity since temperatures at the metal furnace sections 10, 110 remain at temperatures below 200° C. during graphitization due to the intervening carbon pack material (see "I" in FIG. 4). The heat generated by the Joule effect during graphitization, i.e. the heat wave from the electrode bodies, does not reach the metal furnace sections, 10, 110 until several hours after graphitization is complete (see "II" in FIG. 4) and the electric voltage applied to the bodies 52 has been turned off When the "heat wave" from the graphitized bodies 52 ultimately reaches the metal furnace sections 10, 110 the cardboard liner 900 is essentially burned and reduced to char. However, when this occurs there is no longer any need for electrical isolation between the bodies 52 and the metal furnace sections 10,110.

A further embodiment for providing electrical isolation between carbon bodies 52 and metal furnace sections 10, 110 is shown in FIG. 12 in the form of an adherent paint coating 950 on the interior of metal furnace sections 10, 110. The dried coating is 0.005 inch to 0.050 inch thick and is alumina and/or silica based, i.e. 50% by weight or more of silica and/or alumina, and is electrically insulating. The coating 950 while very thin, is, in view of the relatively low applied voltage, 100 V.D.C., sufficient to electrically isolate carbon bodies 52 from metal furnace sections 10, 110. While the alumina and/or silica based coating is also thermally insulating, due to its relative thinness, 0.005 to 0.050 inch, there is no significant effect on the cooling of the electrode bodies or pack material 50 in metal furnace sections 10, 110. Therefore, the coating is essentially thermally non-interfering but electrically insulating.

Specific examples of commercially available suitable paints are as follows:

| | |
|---|---|
| ZYP VITRAGUARD | (ZYP Coatings Inc.) |
| ZYPSEALMET | (ZYP Coatings Inc.) |
| PYRRHOS-1600 | ORPAC Inc. |
| PYROMARK-2100 | Tempil Div., Big Three Industries |
| MINTEQ-QSIL | MINTEC Inc. |
| MINTEC-QCOAT | MINTEC Inc. |
| VHP Flame Roof | Advanced Packaging and Products Co. |
| Forrest Stove Brite | Forrest Technical Coatings |

Figure 13A:
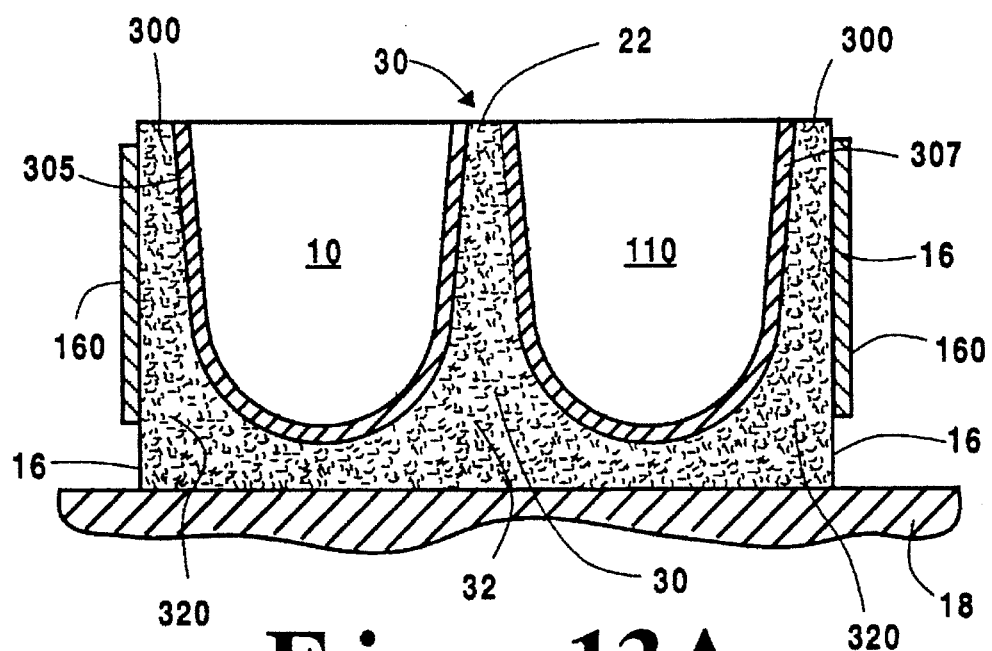
FIG. 13 and FIG. 13A show an arrangement for further enhancing the cooling of the furnace of FIG. 1.
Figure 13:
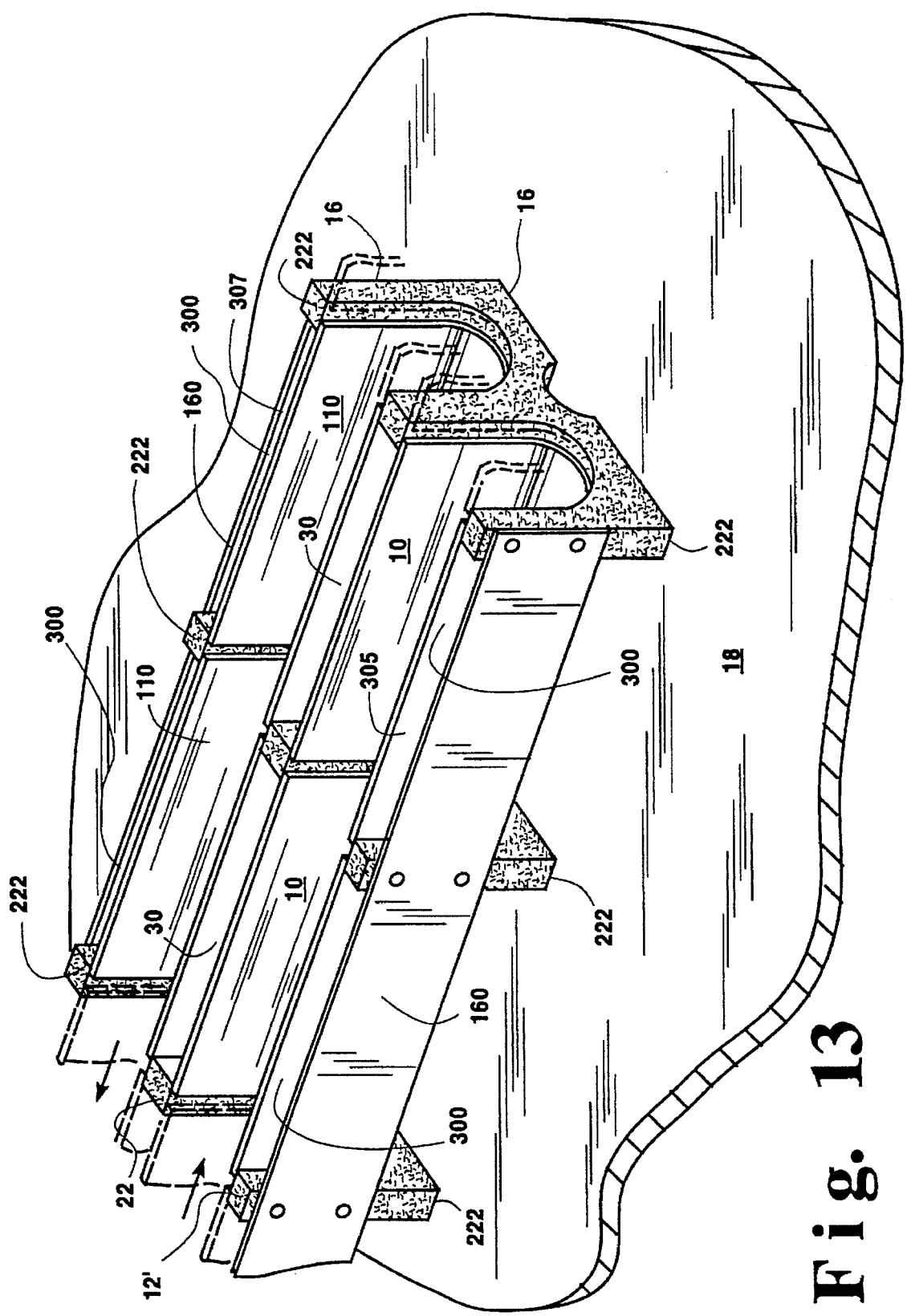

In a further embodiment of the present invention shown in FIGS. 13, 13A, metal side panels 160 are fixed to the outside posts 222 of the rib support members 16 to provide flues 300 defined by the outermost surfaces 305, 307 of metal furnace sections 10, 110 and outer posts 222 of rib support 16 which leave a lower opening 320 which is wider than flue 300 at its uppermost portion. A venturi effect is thus provided by which hot air at the bottom of metal furnace sections 10, 110 is drawn with increasing velocity upwardly through flue 300 to achieve an additional cooling effect.

What is claimed is:

1. A furnace for the graphitization of carbon bodies comprising:
   (a) a plurality of stationary spaced apart electrically non-conductive refractory rib support members resting on an electrically non-conductive, stationary base platform, each said refractory rib support members having a pair of side-by-side open-topped U-shaped apertures which are spaced away from said base platform and separated from each other by a post shaped integral portion of the refractory rib support member, said plurality of spaced apart refractory rib support members being arranged adjacently parallel with their respective U-shaped apertures in register;
   (b) a plurality of electrically isolated U-shaped continuous metal furnace sections having outer and inner surfaces and bottom surfaces spaced from the base platform extending between adjacent refractory rib support members and having terminal portions nesting in the U-shaped apertures of the refractory rib support members to form first and second side-by-side parallel rows of continuous metal furnace sections with closely laterally adjacent and opposed side surfaces, each said side-by-side continuous metal furnace sections being separated by a vertical flue which is formed by the post shaped portions of adjacent refractory rib support members, a portion of the base platform and the laterally adjacent and opposed side surfaces of the side-by-side U-shaped metal furnace sections nesting in said refractory rib support members, said vertical flue being open top and bottom, and being venturi-shaped with a bottom opening substantially wider than its top opening for causing ambient air exposed to heat from the bottom surfaces of the metal furnace sections to pass freely upward through the flue at increased velocity from bottom to top to provide cooling of opposed side surfaces of the side-by-side metal furnace sections; and
   (c) a column of end-abutting carbon bodies in each of said first and second rows of metal furnace sections, each said column being surrounded by particulate thermal insulation medium contained within and supported by the inner surfaces of the U-shaped metal furnace sections and said column being held in electrical contact with power heads so that electrical current flows in series through said carbon bodies to convert such carbon bodies to graphite by heating due to the Joule effect.

2. Furnace in accordance with claim 1 wherein the U-shaped apertures of the refractory rib support members are provided with grooves substantially co-extensive with said apertures and the U-shaped continuous metal furnace sections nesting in a common U-shaped aperture have terminal portions separated by such grooves and wherein a plurality of contiguous individual preformed refractory elements are positioned in such grooves with a portion thereof extending outward from such grooves and between the terminal portions of U-shaped continuous metal furnace sections nesting in a common U-shaped aperture.

3. Furnace in accordance with claim 2 wherein said refractory elements are generally T-shaped in form having top cross portions which extend over at least part of the terminal portions of the metal furnace sections separated by said grooves and base portions which extend perpendicular to the cross portions and are fitted into said grooves.

4. Furnace in accordance with claim 1 wherein at least one of said U-shaped continuous metal furnace sections are provided at its opposite ends with integral end terminations which comprises a U-shaped sleeve member spaced outwardly adjacent to the metal furnace section at each of its opposite ends and a U-shaped closure member joining each said sleeve member to the metal furnace section at opposite ends of the metal furnace sections to define open channels at the opposite ends of the metal furnace section for receiving a cooling liquid.

5. Furnace in accordance with claim 4 wherein a U-shaped flange means is joined to said sleeve member and extends transversely thereto for engaging the U-shaped apertures of said rib support members.

6. Furnace in accordance with claim 1 wherein water spray nozzles are provided adjacent the outer surfaces of the side portions of at least one said metal furnace section for directing a spray of water droplets at said outer surface of said side portions and establishing a layer of flowing water on said outer surface of said side and bottom portions.

7. Furnace in accordance with claim 1 wherein water conduits are provided which extend parallel to said metal furnace sections adjacent the outer side surfaces of said metal furnace sections and water spray nozzles extend from said water conduits toward said outer side surfaces of said metal furnace sections for directing a spray of water droplets on said outer side surfaces.

8. Furnace in accordance with claim 1 wherein said metal furnace sections have substantially straight vertical side portions and curved bottom portions and wherein water spray nozzles are provided adjacent the outer surfaces of the side portions of at least one said metal furnace section for directing a spray of water droplets at said outer surface of said side portions and establishing a layer of water on said outer surface of said side and bottom portions.

9. Furnace in accordance with claim 1 wherein the inner surfaces of the U-shaped metal furnace sections are provided with a covering layer of cardboard intermediate the thermal insulation medium and said inner surfaces.

10. Furnace in accordance with claim 1 wherein the inner surfaces of the U-shaped metal furnace sections are provided with a covering paint coating selected from the group consisting of alumina and silica based paint coatings intermediate the thermal insulation medium and said inner surfaces.

11. Furnace in accordance with claim 1 wherein water conduits are provided which extend parallel to said metal furnace sections adjacent the outer side surfaces of said metal furnace sections and water spray nozzles extend from said water conduits toward said outer side surfaces of said metal furnace sections for directing a spray of water droplets on said outer side surfaces at a plurality of locations opposite the thermal insulation medium contained within the inner side surfaces of the metal furnace sections.

12. Furnace in accordance with claim 1 wherein said rib support member terminates in a pair of spaced apart outer post shaped portions and a metal plate is affixed between the other post shaped portions opposite the outer side surfaces of the metal furnace sections to define lateral vertical flues.

13. A furnace for the graphitization of carbon bodies comprising:

(a) a plurality of stationary spaced apart electrically non-conductive refractory rib support members resting on an electrically non-conductive, stationary base platform each said refractory rib support members having a pair of side-by-side open-topped U-shaped apertures which are spaced away from said base platform and separated from each other by a post shaped integral portion of the refractory rib support member, said plurality of spaced apart refractory rib support members being arranged adjacently parallel with their respective U-shaped apertures in register;

(b) a plurality of electrically isolated U-shaped continuous metal furnace sections having outer and inner surfaces and bottom surfaces spaced from the base platform extending between adjacent refractory rib support members and having terminal portions nesting in the U-shaped apertures of the refractory rib support members to form first and second side-by-side parallel rows of continuous metal furnace sections with closely laterally adjacent and opposed side surfaces, said side-by-side continuous metal furnace sections being separated by a vertical flue which is formed by the post shaped portions of adjacent refractory rib support members, a portion of the base platform and the laterally adjacent and opposed side surfaces of the side-by-side U-shaped metal furnace sections nesting in said refractory rib support members, said vertical flue being open top and bottom, and being venturi-shaped with a bottom opening substantially wider than its top opening for causing ambient air exposed to heat from the bottom surfaces of the metal furnace sections to pass freely upward through the flue at increased velocity from bottom to top to provide cooling of opposed side surfaces of the side-by-side metal furnace sections;

(c) a plurality of water spray nozzles positioned adjacent the outer surfaces of the side portions of said metal furnace sections for directing a spray of water droplets at said outer surfaces of said side portions and establishing a layer of water on said outer surface of said side and bottom portions, and (d) a column of end-abutting carbon electrode bodies in each of said first and second rows of metal furnace sections, each said column being surrounded by particulate thermal insulation medium contained within and supported by the inner surfaces of the U-shaped metal furnace sections and said column being held in electrical contact with power heads so that electrical current flows in series through said carbon bodies to convert such carbon bodies to graphite by heating due to the Joule effect.

14. A furnace for the graphitization of carbon bodies comprising:

(a) a plurality of stationary spaced apart electrically non-conductive refractory rib support members resting on an electrically non-conductive, stationary base platform, each said refractory rib support members having a U-shaped aperture spaced away from said base platform, said plurality of spaced apart refractory rib support members being arranged with their respective U-shaped apertures in register;

(b) a plurality of electrically isolated U-shaped continuous metal furnace sections having outer and inner surfaces and bottom surfaces spaced from the base platform extending between adjacent refractory rib support members and having terminal portions nesting in the U-shaped apertures of the refractory rib support members to form a row of continuous metal furnace sections;

(c) a plurality of water spray nozzles positioned adjacent the outer surfaces of the side portions of said metal furnace sections for directing a spray of water droplets at said outer surfaces of said side portions and establishing a layer of water on said outer surface of said side and bottom portions, and (d) a column of end-abutting carbon electrode bodies in said row of metal furnace sections, each said column being surrounded by particulate thermal insulation medium contained within and supported by the inner surfaces of the U-shaped metal furnace sections and said column being held in electrical contact with power heads so that electrical current flows in series through said carbon bodies to convert the carbon bodies to graphite by heating due to the Joule effect.

15. A furnace for the graphitization of carbon bodies comprising:

(a) a plurality of stationary spaced apart electrically non-conductive refractory rib support members resting on an electrically non-conductive, stationary base platform, each said refractory rib support members having a pair of side-by-side open-topped U-shaped apertures which are spaced away from said base platform and separated from each other by a post shaped integral portion of the refractory rib support member, said plurality of spaced apart refractory rib support members being arranged adjacently parallel with their respective U-shaped apertures in register;

(b) a plurality of electrically isolated U-shaped continuous metal furnace sections having outer and inner surfaces and bottom surfaces spaced from the base platform extending between adjacent refractory rib support members and having terminal portions nesting in the U-shaped apertures of the refractory rib support members to form first and second side-by-side parallel rows of continuous metal furnace sections with closely laterally adjacent and opposed side surfaces, said side-by-side continuous metal furnace sections being separated by a vertical flue which is formed by the post shaped portions of adjacent refractory rib support members, a portion of the base platform and the laterally adjacent and opposed side surfaces of the side-by-side U-shaped metal furnace sections nesting in said refractory rib support members, said vertical flue being open top and bottom, and being venturi-shaped with a bottom opening substantially wider than its top opening for causing ambient air exposed to heat from the bottom surfaces of the metal furnace sections to pass freely upward through the flue at increased velocity from bottom to top to provide cooling of opposed side surfaces of the side-by-side metal furnace sections, said U-shaped continuous metal furnace sections being provided at opposite ends with integral end terminations which comprise a U-shaped sleeve member spaced outwardly adjacent a metal furnace section at each of its opposite ends and a U-shaped closure member joining each said sleeve member a metal furnace section at opposite ends of the metal furnace sections to define open channels at the opposite ends of the metal furnace section for receiving a cooling liquid in the form of water;

(c) a plurality of water spray nozzles positioned adjacent the outer surfaces of the side portions of said metal furnace sections for directing a spray of water droplets at said outer surfaces of said side portions and establishing a layer of water on said outer surface of said side and bottom portions, and (d) a column of end-abutting carbon electrode bodies in each of said first and second rows of metal furnace sections, each said column being surrounded by particulate thermal insulation medium contained within and supported by the inner surfaces of the U-shaped metal furnace sections and said column being held in electrical contact with power heads so that electrical current flows in series through said carbon bodies to convert such carbon bodies to graphite by heating due to the Joule effect.

16. A furnace for the graphitization of carbon bodies comprising:

(a) a plurality of stationary spaced apart electrically non-conductive refractory rib support members resting on an electrically non-conductive, stationary base platform, each said refractory rib support members having a pair of side-by-side open-topped U-shaped apertures which are spaced away from said base platform and separated from each other by a post shaped integral portion of the refractory rib support member, said plurality of spaced apart refractory rib support members being arranged adjacently parallel with their respective U-shaped apertures in register;

(b) a plurality of electrically isolated U-shaped continuous metal furnace sections having outer and inner surfaces and bottom surfaces spaced from the base platform extending between adjacent refractory rib support members and having terminal portions nesting in the U-shaped apertures of the refractory rib support members to form first and second side-by-side parallel rows of continuous metal furnace sections with closely laterally adjacent and opposed side surfaces, said side-by-side continuous metal furnace sections being separated by a vertical flue which is formed by the post shaped portions of adjacent refractory rib support members, a portion of the base platform and the laterally adjacent and opposed side surfaces of the side-by-side U-shaped metal furnace sections nesting in said refractory rib support members, said vertical flue being open top and bottom, and being venturi-shaped with a bottom opening substantially wider than its top opening for causing ambient air exposed to heat from the bottom surfaces of the metal furnace sections to pass freely upward through the flue at increased velocity from bottom to top to provide cooling of opposed side surfaces of the side-by-side metal furnace sections and the U-shaped apertures of the refractory rib support members being provided with grooves substantially co-extensive with said apertures and the U-shaped continuous metal furnace sections nesting in a common U-shaped aperture having their terminal portions separated by such grooves and a plurality of contiguous individual pre-formed refractory elements being positioned in the grooves with a portion thereof extending outward from such grooves and between the terminal portions of U-shaped continuous metal furnace sections nesting in a common U-shaped aperture;

(c) a plurality of water spray nozzles positioned adjacent the outer surfaces of the side portions of said metal furnace sections for directing a spray of water droplets at said outer surfaces of said side portions and establishing a layer of water on said outer surface of said side and bottom portions, and (d) a column of end-abutting carbon electrode bodies in each of said first and second rows of metal furnace sections, each said column being surrounded by particulate thermal insulation medium contained within and supported by the inner surfaces of the U-shaped metal furnace sections and said column being held in electrical contact with power heads so that electrical current flows in series through said carbon bodies to convert the carbon bodies to graphite by heating due to the Joule effect.

17. A method for the lengthwise graphitization of carbon bodies comprising:

(a) providing a plurality of stationary spaced apart electrically non-conductive refractory rib support members resting on an electrically non-conductive, stationary base platform, each said refractory rib support members each having a pair of side-by-side open-topped U-shaped apertures which are spaced away from said base platform and separated from each other by a post shaped integral portion of the refractory rib support member, said plurality of spaced apart refractory rib support members being arranged adjacently parallel with their respective U-shaped apertures in register;

(b) providing a plurality of electrically isolated U-shaped continuous metal furnace sections having outer and inner surfaces and bottom surfaces spaced from the base platform extending between adjacent refractory rib support members and having terminal portions nesting in the U-shaped apertures of the refractory rib support members to form first and second side-by-side parallel rows of continuous metal furnace sections with closely laterally adjacent and opposed side surfaces, said side-by-side continuous metal furnace sections being separated by a vertical flue which is formed by the post shaped portions of adjacent refractory rib support members, a portion of the base platform and the laterally adjacent and opposed side surfaces of the side-by-side U-shaped metal furnace sections nesting in said refractory rib support members, said vertical flue being open top and bottom, and being venturi-shaped with a bottom opening substantially wider than its top opening for causing ambient air exposed to heat from the bottom surfaces of the metal furnace sections to pass freely upward through the flue at increased velocity from bottom to top to provide cooling of opposed side surfaces of the side-by-side metal furnace sections; and (c) providing a column of end-abutting carbon electrode bodies in each of said first and second rows of metal furnace sections, each said column being surrounded by particulate thermal insulation medium contained within and supported by the inner surfaces of the U-shaped metal furnace sections and said column being held in electrical contact with power heads so that electrical current flows in series through said carbon bodies to convert the carbon bodies to graphite by heating due to the Joule effect.

18. Method for the lengthwise graphitization of carbon bodies comprising:

(a) providing a plurality of stationary spaced apart electrically non-conductive refractory rib support members resting on an electrically non-conductive, stationary base platform, each said refractory rib support members each having a pair of side-by-side open-topped U-shaped apertures which are spaced away from said base platform and separated from each other by a post shaped integral portion of the refractory rib support member, said plurality of spaced apart refractory rib support members being arranged adjacently parallel with their respective U-shaped apertures in register;

(b) providing a plurality of electrically isolated U-shaped continuous metal furnace sections having outer and inner surfaces and bottom surfaces spaced from the base platform extending between adjacent refractory rib support members and having terminal portions nesting in the U-shaped apertures of the refractory rib support members to form first and second side-by-side parallel rows of continuous metal furnace sections with closely laterally adjacent and opposed side surfaces, said side-by-side continuous metal furnace sections being separated by a vertical flue which is formed by the post shaped portions of adjacent refractory rib support members, a portion of the base platform and the laterally adjacent and opposed side surfaces of the side-by-side U-shaped metal furnace sections nesting in said refractory rib support members, said vertical flue being open top and bottom, and being venturi-shaped with a bottom opening substantially wider than its top opening for causing ambient air exposed to heat from the bottom surfaces of the metal furnace sections to pass freely upward through the flue at increased velocity from bottom to top to provide cooling of opposed side surfaces of the side-by-side metal furnace sections;

(c) providing a plurality of water spray nozzles positioned adjacent the outer surfaces of the side portions of said metal furnace sections for directing a spray of water droplets at said outer surfaces of said side portions and establishing a layer of water on said outer surface of said side and bottom portions, and (d) providing a column of end-abutting carbon electrode bodies in each of said first and second rows of metal furnace sections, each said column being surrounded by particulate thermal insulation medium contained within and supported by the inner surfaces of the U-shaped metal furnace sections and said column being held in electrical contact with power heads so that electrical current flows in series through said carbon bodies to convert the carbon bodies to graphite by heating due to the Joule effect.

19. Method for the lengthwise graphitization of carbon bodies comprising:

(a) providing a plurality of stationary spaced apart electrically non-conductive refractory rib support members resting on an electrically non-conductive, stationary base platform, each said refractory rib support members each having a U-shaped aperture spaced away from said base platform, said plurality of spaced apart refractory rib support members being arranged with their respective U-shaped apertures in register;

(b) providing a plurality of electrically isolated U-shaped continuous metal furnace sections having outer and inner surfaces and bottom surfaces spaced from the base platform extending between adjacent refractory rib support members and having terminal portions nesting in the U-shaped apertures of the refractory rib support members to form a row of continuous metal furnace sections;

(c) providing a plurality of water spray nozzles positioned adjacent the outer surfaces of the side portions of said metal furnace sections for directing a spray of water droplets at said outer surfaces of said side portions and establishing a layer of water on said outer surface of said side and bottom portions, and (d) providing a column of end-abutting carbon electrode bodies in said row of metal furnace sections, each said column being surrounded by particulate thermal insulation medium contained within and supported by the inner surfaces of the U-shaped metal furnace sections and said column being held in electrical contact with power heads so that electrical current flows in series through said carbon bodies to convert the carbon bodies to graphite by heating due to the Joule effect.

* * * * *